United States Patent
Sheridan

(10) Patent No.: US 11,300,057 B2
(45) Date of Patent: Apr. 12, 2022

(54) GEAR TRAIN FOR GAS GEARED GAS TURBINE ENGINE

(71) Applicant: United Technologies Corporation, Farmington, CT (US)

(72) Inventor: William G. Sheridan, Southington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 728 days.

(21) Appl. No.: 15/981,559

(22) Filed: May 16, 2018

(65) Prior Publication Data

US 2019/0353105 A1 Nov. 21, 2019

(51) Int. Cl.
*F02C 7/36* (2006.01)
*F02K 3/04* (2006.01)
*F16D 41/069* (2006.01)
*F16H 1/20* (2006.01)

(52) U.S. Cl.
CPC .................. *F02C 7/36* (2013.01); *F02K 3/04* (2013.01); *F16D 41/069* (2013.01); *F16H 1/20* (2013.01)

(58) Field of Classification Search
CPC combination set(s) only.
See application file for complete search history.

(56) References Cited

U.S. PATENT DOCUMENTS

| | | |
|---|---|---|
| 2012/0201657 A1 | 8/2012 | Donnelly et al. |
| 2016/0222975 A1 | 8/2016 | Sheridan et al. |
| 2017/0002738 A1 | 1/2017 | Sheridan |
| 2017/0122330 A1* | 5/2017 | Mastro ................. F04D 29/325 |
| 2017/0211477 A1 | 7/2017 | Menheere et al. |
| 2019/0292943 A1* | 9/2019 | Sheridan ................. F02C 7/36 |

FOREIGN PATENT DOCUMENTS

| | | | |
|---|---|---|---|
| EP | 3282093 A1 | 2/2018 | |
| WO | 2011011682 A2 | 1/2011 | |
| WO | WO-2015060912 A2 * | 4/2015 | ........... F04D 29/325 |

OTHER PUBLICATIONS

European Search Report for Application No. EP 19 17 4968.

* cited by examiner

*Primary Examiner* — Jason H Duger
*Assistant Examiner* — Roberto Toshiharu Igue
(74) *Attorney, Agent, or Firm* — Cantor Colburn LLP

(57) ABSTRACT

A gas turbine engine including a fan and an oil pump operatively connected to the fan by a main input drive gear, the drive gear rotating when the fan rotor rotates in either a first or second direction of the fan. Further included is a gear train intermediate the main input drive gear and the oil pump, the gear train including a first and second pinion gear, the first and second pinion gear each driven by the main input drive gear, the first pinion gear driving a first gear through a first clutch, the second pinion gear driving a second gear through a second clutch. Only one of the clutches transmits rotation from the respective pinion gear to the respective gear when the fan is rotating in the first direction, with the only the other clutch transmitting rotation when the fan is rotating in the second direction.

14 Claims, 3 Drawing Sheets

GEAR TRAIN FOR GAS GEARED GAS TURBINE ENGINE

BACKGROUND

Exemplary embodiments pertain to the art of gas turbine engines and, more particularly, to a windmill lubrication gear train for use in such engines.

Gas turbine engines are known and may typically include a fan delivering air into a bypass duct as bypass air and into a core engine. Air in the core engine is delivered to a compressor where is it compressed and delivered into a combustor section. The compressed air is mixed with fuel and ignited and products of this combustion pass downstream over turbine rotors, driving them to rotate.

Historically, a turbine rotor was directly connected to drive the fan. However, recently it has been proposed to include a gear reduction between the turbine and the fan rotor. The gear reduction requires adequate lubrication under all operational conditions. One challenge is that a fan rotor on a gas turbine engine can experience so-called "windmilling" operation. Windmilling can occur if the engine is otherwise shutdown while in flight and air is driven across the fan blades by the movement of the associated aircraft. This may cause the fan rotor to rotate. In addition, a high wind while the associated aircraft is on the ground may also cause windmilling. Lubricant must be supplied to the gear reduction during this windmilling operation, and a further challenge is that the windmilling rotation of the fan rotor can occur in either direction. While gear trains are known which supply lubrication during rotation in either direction of windmill rotation, they require relatively large package space.

BRIEF DESCRIPTION

Disclosed is a gas turbine engine including a fan driven by a fan drive turbine through a gear reduction. Also included is an oil pump operatively connected to the fan by a main input drive gear, the main input drive gear rotating when the fan rotor rotates in either a first direction or a second direction of the fan. Further included is a gear train intermediate the main input drive gear and the oil pump, the gear train including a first pinion gear and a second pinion gear, the first pinion gear and the second pinion gear each driven by the main input drive gear, the first pinion gear driving a first gear through a first clutch, the second pinion gear driving a second gear through a second clutch. The first clutch transmits rotation from the first pinion gear to the first gear when the fan is rotating in the first direction, and the first clutch not transmitting rotation from the first pinion gear to the first gear when the fan is rotating in the second direction. The second clutch does not transmit rotation from the second pinion gear to the second gear when the fan is rotating in the first direction, the second clutch transmitting rotation from the second pinion gear to the second gear when the fan is rotating in the second direction.

In addition to one or more of the features described above, or as an alternative, further embodiments may include that the oil pump is rotatable about a common axis with the first pinion gear.

In addition to one or more of the features described above, or as an alternative, further embodiments may include that the oil pump is rotatable about a common axis with the second pinion gear.

In addition to one or more of the features described above, or as an alternative, further embodiments may include that said first and second clutches are sprag clutches.

In addition to one or more of the features described above, or as an alternative, further embodiments may include that the gear train is operable to allow the engine to operate under windmill conditions in the air for 90 minutes or longer.

In addition to one or more of the features described above, or as an alternative, further embodiments may include that the gas turbine engine is operable to fly under negative gravity conditions for at least 20 seconds.

In addition to one or more of the features described above, or as an alternative, further embodiments may include that the gear train is operable indefinitely on the ground when windmilling with wind speeds below 85 mph or less.

Also disclosed is an oil pump gear train assembly for a gas turbine engine, the oil pump gear train assembly including an oil pump operatively connected to an engine fan by a main input drive gear. Also included is a first pinion gear in contact with, and directly driven by, the main input drive gear. Further included is a second pinion gear in contact with, and directly driven by, the main input drive gear. Yet further included is a first gear driven by the first pinion gear through a first clutch. Also included is a second gear driven by the second pinion gear through a second clutch, the first gear and the second gear in contact with each other. The first clutch transmits rotation from the first pinion gear to the first gear when the fan is rotating in the first direction, the first clutch not transmitting rotation from the first pinion gear to the first gear when the fan is rotating in the second direction. The second clutch does not transmit rotation from the second pinion gear to the second gear when the fan is rotating in the first direction, the second clutch transmitting rotation from the second pinion gear to the second gear when the fan is rotating in the second direction.

In addition to one or more of the features described above, or as an alternative, further embodiments may include that the oil pump is rotatable about a common axis with the first pinion gear.

In addition to one or more of the features described above, or as an alternative, further embodiments may include that the oil pump is rotatable about a common axis with the second pinion gear.

In addition to one or more of the features described above, or as an alternative, further embodiments may include that said first and second clutches are sprag clutches.

In addition to one or more of the features described above, or as an alternative, further embodiments may include that the gear train is operable to allow the engine to operate under windmill conditions in the air for 90 minutes or longer.

In addition to one or more of the features described above, or as an alternative, further embodiments may include that the gas turbine engine is operable to fly under negative gravity conditions for at least 20 seconds.

In addition to one or more of the features described above, or as an alternative, further embodiments may include that the gear train is operable indefinitely on the ground when windmilling with wind speeds below 85 mph or less.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
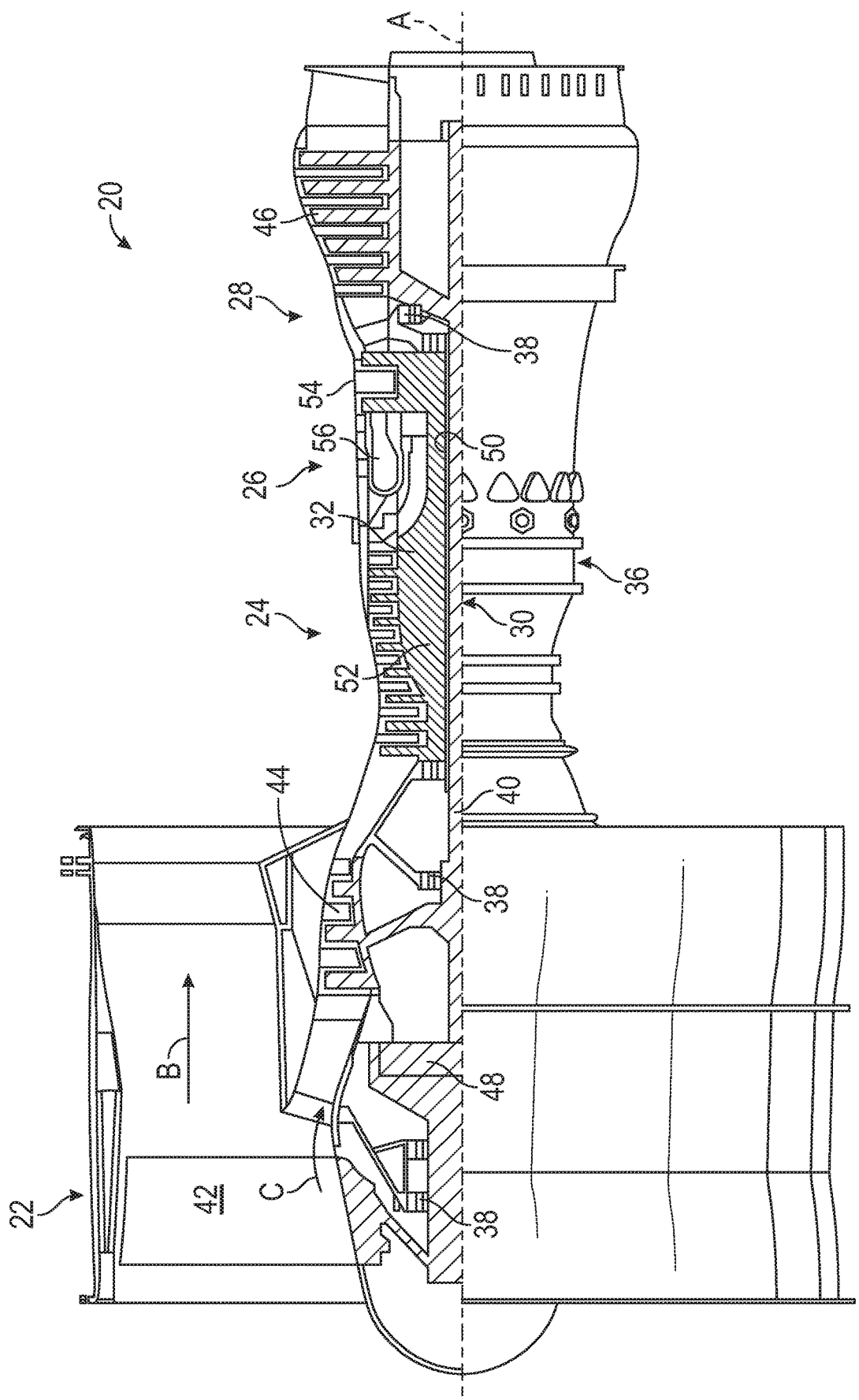
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system, a star gear system, or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
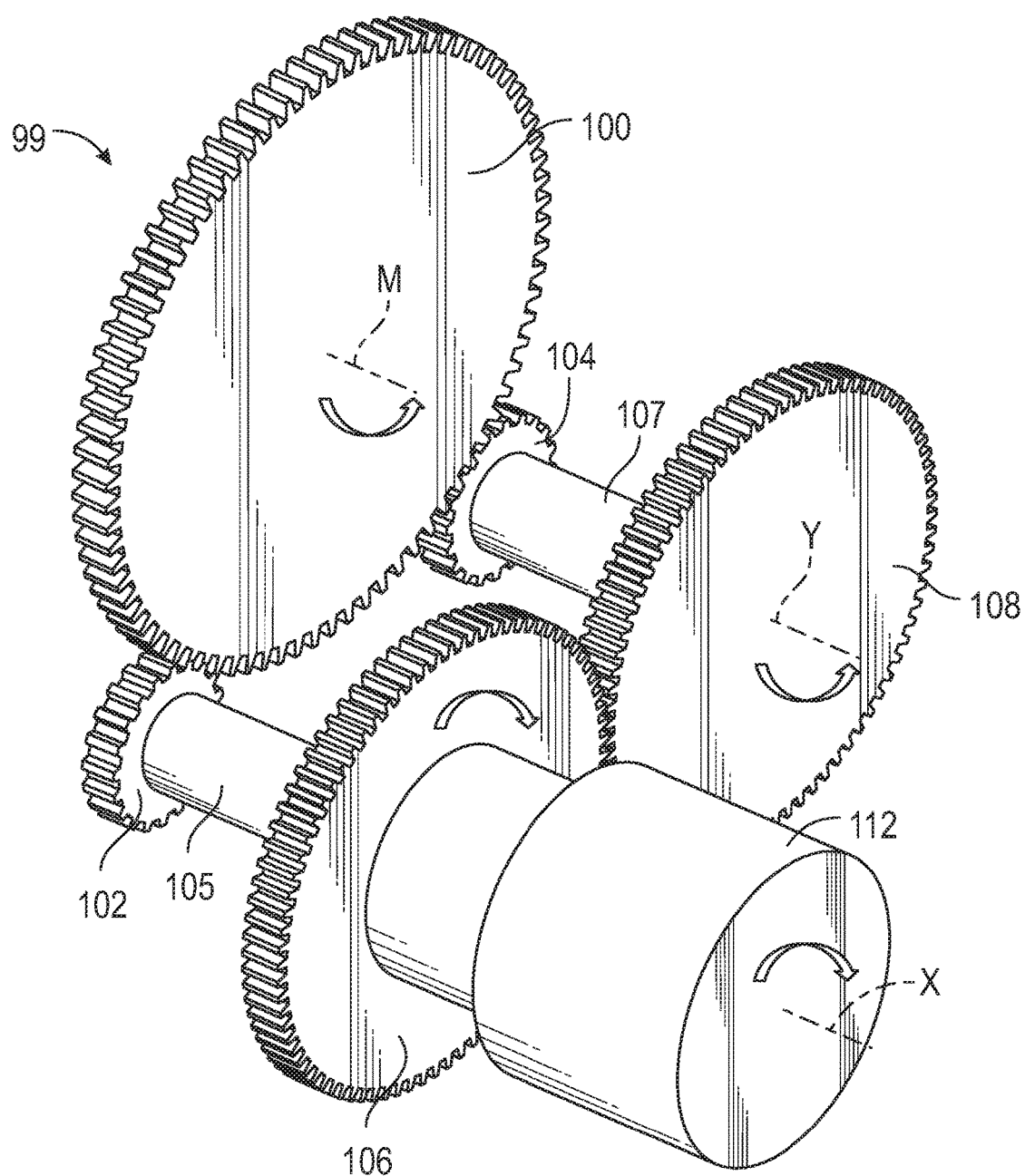
FIG. 2 is a perspective view of a gear train.

FIG. 2 shows a gear train 99 for driving an oil pump 112. It should be understood the oil pump could be a main lubricant pump for a main lubricant system, or could be an auxiliary pump for an auxiliary system. Some details of the overall lubricant system such as disclosed in published United States Patent Application No. US2017/0002738 may be utilized. As explained in that application, it is desirable for a lubricant system to provide lubricant to a gear reduction, such as gear reduction 48 in FIG. 1, under certain adverse conditions. If the gear system does not receive adequate lubrication under these adverse conditions, it could cause seizure of the bearings or fracture of the gear teeth located within the gear system. Failure of the gear system could result in loss of drive to the fan and ultimately loss of thrust leading to an in-flight-shut-down (IFSD) of the engine. Damaging both engines at the same time will result in loss of flight.

As one example, if there is a break or interruption in a main oil supply system, it would be desirable for the engine to be able to maintain operation for at least 30 seconds or longer at high power operation (such as takeoff) without damage to the gear reduction. This will provide time for a pilot to shut the engine down safely. Such an interruption could be caused by a break in an oil line, pump failure, or other failure in the main lubrication system.

After such an event, it is desirable to allow the engine to windmill in the air for 90 minutes or longer without damage to the gear reduction. It is also desirable to have the same protection if the engine is shut down for other reasons beyond oil system failure. As an example, a control system failure could shut the engine down and require it to windmill for extended periods of time.

It is also desirable to allow the engine to windmill indefinitely on the ground with wind speeds above 10 m.p.h. and below about 85 m.p.h. Ground windmilling refers to a condition where the engine is shut down. Wind may force the fan to rotate and turn causing components, such as components in the gear reduction to rotate. Such wind can turn the fan in a normal forward direction and also can turn the fan in a reverse direction should the wind flow from the back of the engine. Since ground windmilling transmits very little power through the gear system, only a small quantity of oil is required to meet the life requirement of indefinite windmilling. This small quantity of oil will keep the bearings from seizing and the gear teeth from wearing, thus maintaining the precision machined surfaces on these components. If the gear system components are kept from wearing by providing lubrication, then windmilling on the ground can be maintained for an indefinite period of time.

Finally, it is desirable to allow an aircraft to fly under negative gravity conditions for at least 20 seconds. During negative gravity conditions, the main oil system is interrupted similar to the first mentioned condition, but when positive gravity is returned, the main oil system may recover to full operation. To this end, the schematic pump of this disclosure may be arranged as a lubricant system as disclosed in U.S. Published Patent Application No. US 2017/0002738, the disclosure of which is incorporated by reference.

The previously cited published patent application provides an overall main and auxiliary oil supply system which can meet all of these goals. The features of the previously cited application relating to achieving these goals are hereby incorporated by reference. The current application is related to a gear train for efficiently packaging a drive that can ensure the oil pump will supply oil when experiencing windmilling in either forward or reverse rotation.

FIG. 2 shows a gear train 99 which will drive lubricant pump 112, when an associated fan rotor is windmilling in either direction. A main input drive gear 100 (which may also be referred to herein as a "bull gear") is fixed to rotate about axis M and with the fan rotor. It may actually be driven by a portion of the gear reduction, by the fan shaft itself, or by some other component which rotates with the fan shaft, such as the low speed spool as disclosed with regard to FIG. 1. In particular, it is to be appreciated that the main input drive gear 100 may be driven about axis A, such that axis M coincides with axis A, or the main input drive gear 100 may be driven by a set of gears to have it rotate about an offset location, such that axis M does not coincide with axis A.

Main input drive gear 100 is engaged with a first pinion gear 102 in a manner that allows main input drive gear 100 to drive first pinion gear 102. Main input drive gear 100 is also engaged with a second pinion gear 104 in a manner that allows main input drive gear 100 to drive second pinion gear 104. The first pinion gear 102 is operatively coupled to a first gear 106 through a first clutch 105 to selectively drive the first gear 106. The first pinion gear 102 and the first gear 106 rotate about an axis of rotation X. The second pinion gear 104 is operatively coupled to a second gear 108 through a second clutch 107 to selectively drive the second gear 108. The second pinion gear 104 and the second gear 108 rotate about an axis of rotation Y.

The first gear 106 may also be referred to as a pump drive gear, as the first gear 106 directly drives rotation of pump 112 about axis of rotation X. Therefore, the first pinion gear 102, the first gear 106 and the pump rotate about a common axis, specifically axis of rotation X. The second gear 108 may be referred to as a reverse idler which is, in turn, engaged to the first gear 106, as shown. It is contemplated that the pump 112 may be directly driven by the second gear 108 in some embodiments, such that the pump 112 rotates about axis of rotation Y. Regardless of which axis the pump 112 is aligned with (i.e., X or Y), the axial alignment locates the pump 112 closer to the main axis of rotation M, thereby providing an advantageous packaging condition.

When the fan 42 is being driven in its forward or normal flight direction of rotation, second clutch 107 will slip such that the second pinion gear 104 does not drive the second gear 108. At the same time, the first clutch 105 does not slip, thereby allowing the first pinion gear 102 to drive the first gear 106. When the fan is driven in its reverse direction, first clutch 105 will slip and the second clutch 107 will allow the second pinion gear 104 to drive the second gear 108. The two directional scenarios of the main input drive gear 100 are represented in the following table:

| Bull Gear | Pinion 1 | Clutch 1 | Gear 1 | Pinion 2 | Clutch 2 | Gear 2 | Pump |
|---|---|---|---|---|---|---|---|
| CCW | CW | Locked | CW | CW | Slips | CCW | CW |
| CW | CCW | Slips | CW | CCW | Locked | CCW | CW |

Figure 3:
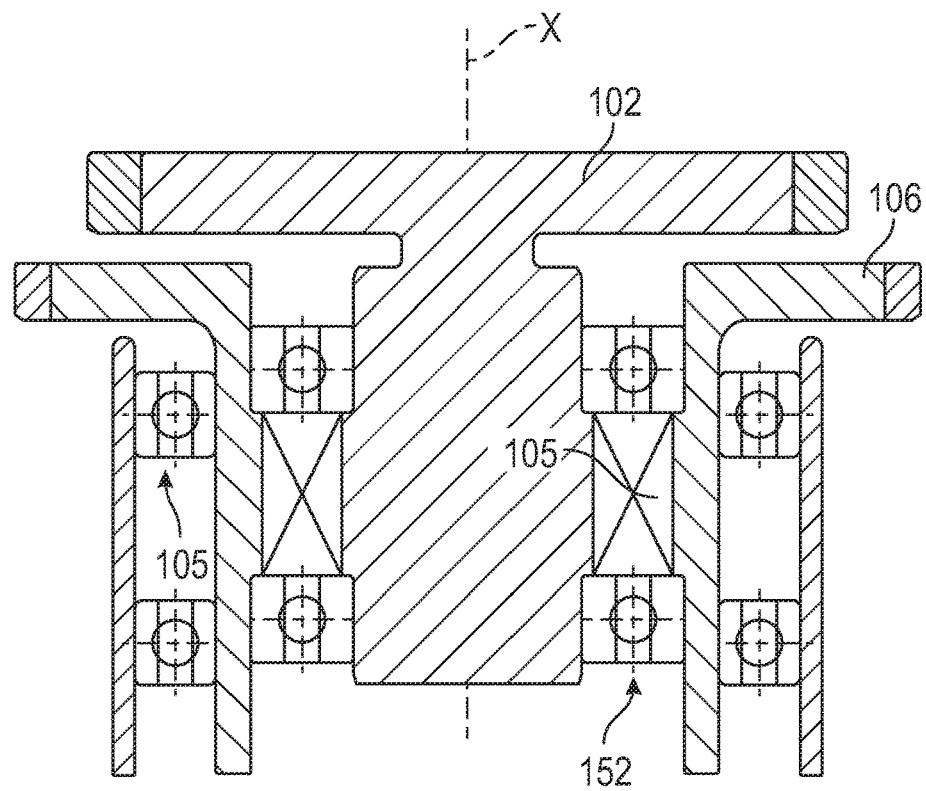
FIG. 3 is a sectional view of a drive connection of a portion of the gear train.

Referring to FIG. 3, a portion of the gear train 99 is illustrated in greater detail. As shown, the first pinion gear 102 and the first gear 106 are concentrically arranged relative to each other. The first gear 106 is mounted on a first set of bearings 150 that are supported by a static structure of the engine 20 (i.e., fixed to ground). The first pinion 102 is mounted concentrically to the first gear 106 with a second set of bearings 152. The first clutch 105 is disposed between the first gear 106 and the first pinion gear 102. The first clutch 105 is a one-way directional clutch that allows the first pinion gear 102 to drive the first gear 106 in one direction or allows the gear 106 to spin freely upon the first pinion gear 102 in the opposite direction. The first clutch 105 may be a sprag clutch in some embodiments, but any clutch that is intended for slipping in one direction may be suitable, as described herein.

FIG. 3 illustrates the first pinion gear 102 and first gear 106 arrangement in detail. The description associated with FIG. 3 is applicable to the arrangement of the second pinion gear 104 and the second gear 108, the one-way directional control facilitated by the second clutch 107. Duplicative description is not provided.

Figure 4:
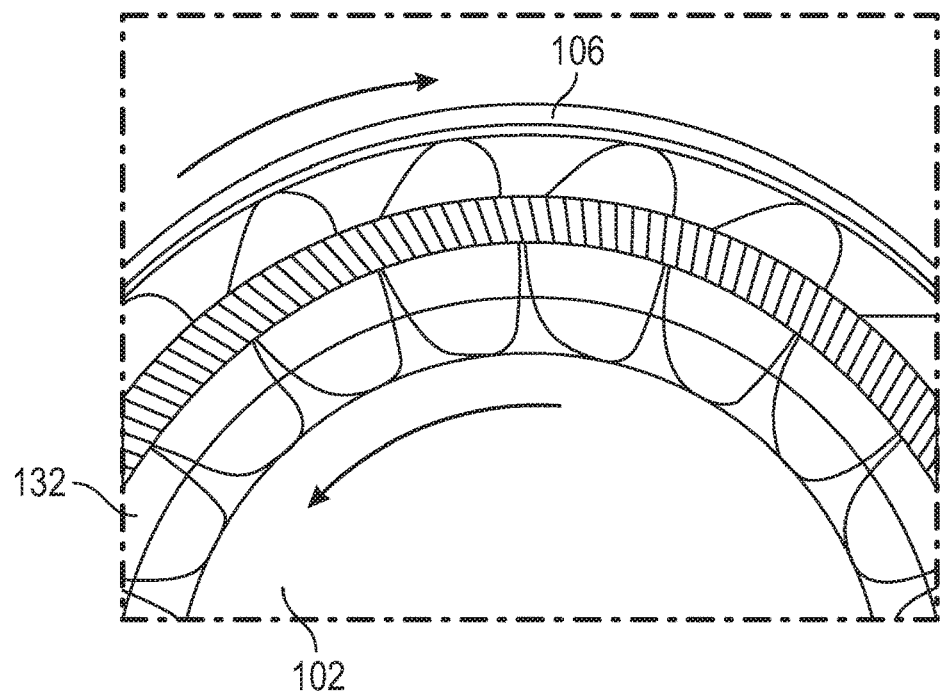
FIG. 4 is a sectional view of a clutch of the drive connection of FIG. 3.

As shown in FIG. 4, sprag clutch members 132 will transmit rotation from the first pinion gear 102 to the first gear 106 when driven in the forward direction. However, when rotation occurs in the reverse direction, such rotation will not be transmitted by the members 132. While a sprag clutch is shown, other mechanical clutches that transmit rotation in one direction, but prohibits the transfer of torque in the opposed direction. As other examples, ramp roller clutches and spring clutches may be used.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
   a fan driven by a fan drive turbine through a gear reduction;
   an oil pump operatively connected to the fan by a main input drive gear, the main input drive gear rotating when the fan rotates in either a first direction or a second direction of the fan; and
   a gear train intermediate the main input drive gear and the oil pump, the gear train including a first pinion gear and a second pinion gear, the first pinion gear and the second pinion gear each in contact with and directly driven by the main input drive gear, the first pinion gear driving a first gear through a first clutch; the second pinion gear driving a second gear through a second clutch, the first gear and the second gear in contact with each other;
   wherein the first clutch transmits rotation from the first pinion gear to the first gear when the fan is rotating in the first direction, the first clutch not transmitting rotation from the first pinion gear to the first gear when the fan is rotating in the second direction;
   wherein the second clutch does not transmit rotation from the second pinion gear to the second gear when the fan is rotating in the first direction, the second clutch transmitting rotation from the second pinion gear to the second gear when the fan is rotating in the second direction.

2. The gas turbine engine of claim 1, wherein the oil pump is rotatable about a common axis with the first pinion gear.

3. The gas turbine engine of claim 1, wherein the oil pump is rotatable about a common axis with the second pinion gear.

4. The gas turbine engine of claim 1, wherein said first and second clutches are sprag clutches.

5. The gas turbine engine of claim 1, wherein the gear train is operable to allow the engine to operate under windmill conditions in the aft for 90 minutes or longer.

6. The gas turbine engine of claim 1, wherein the gas turbine engine is operable to fly under negative gravity conditions for at least 20 seconds.

7. The gas turbine engine of claim 1, wherein the gear train is operable indefinitely on the ground when windmilling with wind speeds below 85 mph or less.

8. An oil pump gear train assembly of a gas turbine engine having a fan driven by a fan drive turbine through a gear reduction, the assembly comprising:
   an oil pump operatively connected to the fan by a main input drive gear, the main input drive gear rotating when the fan rotates in either a first direction or a second direction of the fan; and
   a gear train intermediate the main input drive gear and the oil pump, the gear train comprising:
   a first pinion gear in contact with, and directly driven by, the main input drive gear;
   a second pinion gear in contact with, and directly driven by, the main input drive gear;
   a first gear driven by the first pinion gear through a first clutch; and
   a second gear driven by the second pinion gear through a second clutch,
   the first gear and the second gear in contact with each other;
   wherein the first clutch transmits rotation from the first pinion gear to the first gear when the fan is rotating in the first direction, the first clutch not transmitting rotation from the first pinion gear to the first gear when the fan is rotating in the second direction;
   wherein the second clutch does not transmit rotation from the second pinion gear to the second gear when the fan is rotating in the first direction, the second clutch transmitting rotation from the second pinion gear to the second gear when the fan is rotating in the second direction.

9. The oil pump gear train of claim 8, wherein the oil pump is rotatable about a common axis with the first pinion gear.

10. The oil pump gear train of claim 8; wherein the oil pump is rotatable about a common axis with the second pinion gear.

11. The oil pump gear train of claim 8, wherein said first and second clutches are sprag clutches.

12. The oil pump gear train of claim 8, wherein the gear train is operable to avow the engine to operate under windmill conditions in the air for 90 minutes or longer.

13. The oil pump gear train of claim 8, wherein the gas turbine engine is operable to fly under negative gravity conditions for at least 20 seconds.

14. The oil pump gear train of claim 8, wherein the gear train is operable indefinitely on the ground when windmilling with wind speeds below 85 mph or less.

* * * * *